May 7, 1968      F. A. SEELIG      3,381,986

FRICTIONLESS COUPLING

Filed Feb. 23, 1966

FREDERICK A. SEELIG
INVENTOR.

BY
ATTORNEY

United States Patent Office 3,381,986
Patented May 7, 1968

3,381,986
FRICTIONLESS COUPLING
Frederick A. Seelig, New Hartford, N.Y., assignor to The Bendix Corporation, a corporation of Delaware
Filed Feb. 23, 1966, Ser. No. 529,509
11 Claims. (Cl. 287—86)

ABSTRACT OF THE DISCLOSURE

A frictionless coupling. By combining a plurality of crossed flexure elements with a tubular, generally X-shaped housing and by splitting the housing along the tubular arms so that each spring in an arm is connected on one edge or end to one portion of the arm and on the opposite edge or end to the remaining portion of the arm, the split portions of the housing are able to move on the springs a limited amount relative to each other. Since the pairs of arms are to be connected to separate sets of spring, the coupling is free to execute virtually loss-free limited rotation about two axes.

---

Figure 2:
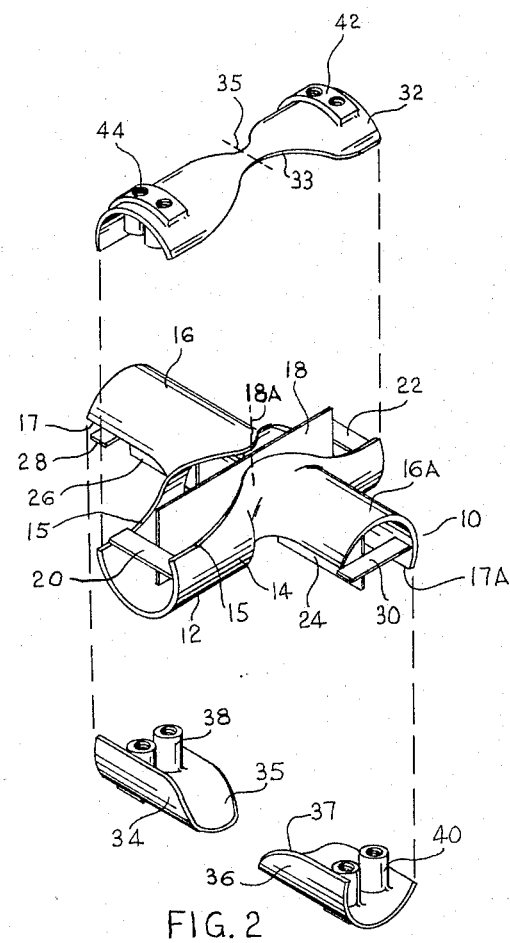

The present invention relates to universal-type couplings having at least two degrees of freedom of rotary motion about two crossed axes. Such devices are well known, but suffer from two defects. They are complex structures requiring component parts of relatively-high mass and as with all complex structures, are expensive to fabricate and assemble. Furthermore, some of the prior art universal couplings were limited to only two degrees of freedom of motion, that is, there was associated with each axis only one degree of freedom of motion. It is, therefore, an object of the present invention to provide a unnversal-type coupling having two axes of freedom of motion and one or more degrees of freedom of motion associated with each axis and which is less massive and less expensive to fabricate than known universal-type couplings.

Since tubular structures have more strength per unit weight and because frictionless couplings rely upon crossed flexure devices, it is, therefore, an object of this invention to provide a universal-type frictionless coupling having generally-tubular arms or beams and crossed-spring flexural elements and which is light in weight and whose manufacturing costs are low in comparison with prior art universal-type couplings.

A frictionless coupling of the type to be described may be used to suspend a rocket engine from a rocket body. Such a rocket body may have its course corrected by altering the position of the rocket engine within the body. In such an application, it is important that there be no sliding or rolling friction since space welding may occur.

Furthermore, it is highly important that the pivotal connection between the engine and body of the rocket be extremely light since every pound of additional weight on the the ground requires many additional pounds of rocket fuel. Therefore, it is another object of the present invention to provide a frictionless coupling having at least two degrees of freedom of motion which is lighter in weight than known frictionless couplings.

In at least on rocket application, a combination of a gimbal ring and a plurality of flexural pivots are used, each pivot having a single degree of freedom of motion. Such pivots are shown in U.S. Patent 3,073,584, issued in the name of Henry Troeger. This combination of flexural pivots and gimbal ring mounted the rocket engine about its throat section to the rocket body to allow a type of universal motion of the rocket engine. Such a device employed at least four pivots. The present invention may be used to replace the four pivots and the gimbal ring and as such, is lighter in weight and lower in cost. Furthermore, the rocket engine will be suspended from the body about its nose rather than about its throat, providing for a far more accurate control of the rocket engine within the body and, therefore, rocket engine position, ultimately providing more accurate rocket guidance because of the lessened deflection of the moment arms.

It is a further object of the present invention to provide a novel frictionless coupling which has four degrees of freedom in two planes which may be ninety degrees apart.

It is a still further object of the present invention to provide a novel multi-axis frictionless coupling which is not formed by hogging or cutting out of solid members, but which uses hollow tubular members and cross flat spring elements.

It is a further object of the present invention to provide a novel frictionless coupling having at least two axes of motion in which the arm or beam elements may be disposed at some angle with respect to each other less than 90 degrees.

The invention further lies in the particular organization of the various elements of this system and their cooperative association with one another to produce the beneficial results intended. The foregoing and other objects and advantages of the invention will appear more fully hereafter from the consideration of the detailed description which follows, taken together with the accompanying drawing wherein one embodiment of the invention is illustrated. It is to be expressly understood, however, that the drawing is for the purpose of illustration and description and not to be construed as defining the limits of the invention.

Figure 1:
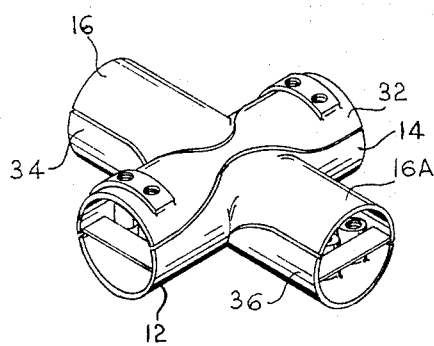

In the drawing wherein a multi-axis frictionless coupling is shown embodying the invention:

FIGURE 1 is a top perspective view; and
FIGURE 2 is in an exploded perspective view.

Turning now to the figures, particularly to FIGURE 2, numeral 10 indicates generally a multi-axis flexible coupling having a generally X-shaped central housing 12 which has a first arm or partial tubular segment 14 which is shown as a partial tubular shape having a peripheral extend 15 which may be an abutment or travel gap, as best seen in FIGURE 1. The partial tubular shape 14 is shown to be open in a first region on one side of the central housing 12. A second hollow partial tubular segment which is shown in a partially tubular shape 16 may be thought of as having two arms 16 and 16a which are open in a second region on a side of the central housing 12 opposed to the first region. First partial tubular segment 14 has a plurality of flat steel spring members or other resilient members fastened to it. A first flat spring member 18 is shown running the major portion of the axial dimension of the first partial tubular segment 14. A plurality of smaller spring members 20 and 22 are fastened to the first partial tubular segment 14 to form a crossed spring relationship with the spring member 18 at an angle of 90 degrees as shown in the drawing. The spring members 18, 20 and 22 are disposed along lines which would be diameter lines of the first partial tubular segment 14 if the tube were complete. Similar flat steel spring members are disposed at the second hollow partial tubular arms 16 and 16a. Here, however, the main spring portion is divided into two members 24 and 26 which are fixed respectively to the first and second arms or portions of the second partial tubular segment 16. The arm 16 has a second spring 28 which is fastened to the inner diameter thereof and the arm 16a has a spring 30 which is fastened to its inner diameter to form a crossed spring relationship with the springs 26 and 24 respectively.

A third partial tubular segment 32 having a peripheral edge 33 is a partially tubular member having an opening corresponding to the first partial tubular segment 14. Third partial tubular segment 32 is fixedly connected relative to the first partial tubular segment 14 by the spring members 18, 20 and 22 which are fixedly connected to the first partial tubular segment 14. The partial tubular segment 32 may form substantially the rest of the tubular shape of the first partial tubular segment 14. Since, however, a small portion of the third partial tubular segment 32 or the first partial tubular segment 14 or both partial tubular segments have been removed, the third partial tubular segment 32 is effectively disposed at a slight distance from the first partial tubular segment 14 such that it may move on the crossed springs relative to the first partial tubular segment 14 and to the second partial tubular segment 16 of the central housing 12. A fourth partial tubular segment, shown generally by numeral 50, consists of first and second arm portions 34 and 36 which are partially tubular members which may be substantially the remaining portion of the partial tubular members segment 16. Each of the arm portion 34 and 36 has a periphery 35, 37, respectively. Part tubular member 34 is fixedly connected to the second partial tubular segment 16, arm 16, by the flat crossed spring members 26 and 28 such that a travel gap is defined between the edge 35 and the edge 17 of the arm portion 34 and second partial tubular segment 16, arm 16, respectively. The second arm portion 36 is connected to the second partial tubular segment 16, arm 16a, by the crossed springs 24 and 30, forming a travel gap between the edges 37 and 17a of the respective arm portions. The travel gaps may be provided by removing portions of the material from fourth partial tubular segment 50 or second partial tubular segment 16 or both of them.

It can readily be seen that the present invention accomplishes its stated objects. A light-weight multiple axis flexural device which may be used either as a universal joint or as a resilient suspension is described. There are two distinct axes of motion because of the capability for movement of the third partial tubular segment 32 relative to the central housing 12 and capability for movement of the fourth partial tubular segment 50 with respect to the central housing 12. In addition, the fourth partial tubular segment 50, arm portions 34 and 36 may be free to move independently of one another. Still further, the third partial tubular segment 32, may itself be divided into two portions along the dotted line 39 so that an additional degree of freedom is shown. To accomplish this, the main spring member must also be divided along the line 18a, as shown in the drawing, so that, in total, four degrees of freedom are possible in that each of the third and fourth partial tubular segments may themselves have two portions which are not moving in phase and which are free to move with respect to one another. Since the first and second partial tubular segments 14 and 16 which oppose the central housing 12 are disposed as shown in the drawing at a 90 degree angle, they delineate two axes of motion at a 90 degree angle. However, unlike prior art frictionless couplings, these segments may be disposed at an angle less than 90 degrees and they may, therefore, be adaptable to additional design configurations.

If the present invention were to be used to suspend a rocket engine from a rocket body, the partial tubular segment 32 would be a single segment and the fourth partial tubular segment 50 would also be acting as a single segment. To that end are shown threaded bolt mounting holes and plates 42 and 44 of the third partial tubular segment 32 and threaded bolt mounting holes 38 and 40 on the segments 34 and 36, respectively, of the fourth partial tubular segment 50. The third partial tubular segment 32 would be fixedly connected to the rocket body and the fourth partial tubular segment 50 would be fixedly connected to the rocket engine. The positional arms of the rocket, not shown, would then be free to move the rocket about the central pivot point defined as the point of intersection between the extension of the spring members 24, 26 and the spring member 18 so that the rocket engine could, in fact, be moved through a figure which would describe a cone shape for directing the rocket.

The central housing 12 and the partial tubular segments 32 and 50 are shown as tubular shapes because they are lighter in weight for the same strength than other configurations such as cubes or regular parallelepipeds. The present invention may be made in a variety of manners, all of which are less expensive than would be fabrication by cutting or hogging out of solid material. For example, the partial tubular segments may be cast or molded they may be made of metal or a plastic-type material, or the partial tubular segments may be formed from separate tubular members which are welded or otherwise fixedly connected together to form the central housing 12. The edge or periphery 33 of the third partial tubular segment 32 and edge 15 of the central housing 12 are shown as helical edges on each side of the tubular housing. This form of edge is exceedingly useful for manufacturing purposes since it may be made by simply rotating and advancing a tubular member relative to a cutting tool or device. However, any other form of cut may be made in the tubular member to provide the travel gaps and abutment surfaces for the flexible coupling or universal coupling.

I claim:
1. A frictionless coupling comprising:
   a main housing means having first and second hollow arm means, said arm means disposed in a mutually crossed relationship;
   said hollow arms open in different regions,
   a plurality of first and second crossed resilient means fixedly connected to said first and second arm means;
   a third arm means connected to one of said first and second crossed resilient means; and
   a fourth arm means connected to the other of said first and second crossed resilient means.
2. The frictionless coupling as claimed in claim 1 wherein:
   said third arm means is connected to one of said first and second resilient means for relative motion with respect to one of said first and second arm means; and
   said fourth arm means is connected to the other of said first and second resilient means for relative motion with respect to the other of said first and second arm means.
3. The frictionless coupling as claimed in claim 1 wherein:
   said resilient means comprises spring means;
   said third arm means connected to said first spring means to permit relative motion between said third and first arm means; and
   said fourth arm means connected to said second spring means to permit relative motion between said fourth and second arm means.
4. The frictionless coupling as claimed in claim 3 wherein:
   said crossed spring members interconnecting said first and third arm means form an angle of about 90 degees with respect to each other.
5. The frictionless coupling as claimed in claim 3 wherein:
   said crossed spring members interconnecting said second and said fourth arm means form an angle of about 90 degrees with respect to each other.
6. The frictionless coupling as claimed in claim 3 wherein:
   said fourth arm means comprises two arm members independently connected to said crossed springs for independent movement with respect to said second arm means.
7. A frictionless coupling comprising:
   a central member having first and second arm portions disposed at an angle with respect to each other;
   said arms formed in a partially tubular shape, each of said arms having a concave surface opening away from the concave surface of the other of said arms;
   each of said arm members having a plurality of crossed spring means fixedly connected thereto;
   a third arm means having a partially tubular shape connected to one of said arm portions by one of said crossed spring means, said third arm disposed opposite one of said arms concave surface; and a fourth arm means having a partially tubular shape connected to the other of said arm portions by the other of said crossed spring means, said fourth arm disposed opposite of said conical surface.

8. The frictionless coupling as claimed in claim 7 wherein:
said first and second arm portions of said central members intersect one another.

9. The frictionless coupling as claimed in claim 7 wherein:
one of said arm portions is connected to one of said third and fourth arm means by an even number of flat crossed spring members.

10. The frictionless coupling as claimed in claim 7 wherein:
one of said arm portions is connected to one of said third and fourth arm means by an odd number of flat crossed spring members.

11. The frictionless coupling as claimed in claim 7 wherein:
said crossed spring members are disposed substantially on a diameter of said tubular arm portions; and
the peripheral extent of said arm members in each plane of motion is less than a closed circumference.

References Cited
UNITED STATES PATENTS

| | | | |
|---|---|---|---|
| 2,931,092 | 4/1960 | Humphrey | 308—2 |
| 2,966,049 | 12/1960 | Ormond | 267—1 |
| 3,181,918 | 5/1965 | Troeger | 308—2 |
| 3,319,951 | 5/1967 | Seelig | 267—1 |

ERWARD C. ALLEN, *Primary Examiner.*

W. L. SHEDD, *Assistant Examiner.*

CARL W. TOMLIN, *Examiner.*